United States Patent
Olszak

(10) Patent No.: US 8,422,026 B2
(45) Date of Patent: Apr. 16, 2013

(54) SPECTRALLY CONTROLLABLE LIGHT SOURCES IN INTERFEROMETRY

(76) Inventor: Artur G. Olszak, Tucson, AZ (US)

(*) Notice: Subject to any disclaimer, the term of this patent is extended or adjusted under 35 U.S.C. 154(b) by 401 days.

(21) Appl. No.: 12/816,091

(22) Filed: Jun. 15, 2010

(65) Prior Publication Data

US 2010/0315650 A1   Dec. 16, 2010

Related U.S. Application Data

(60) Provisional application No. 61/187,024, filed on Jun. 15, 2009.

(51) Int. Cl.
*G01B 11/02* (2006.01)
*G01B 9/02* (2006.01)

(52) U.S. Cl.
USPC ........... 356/498; 356/489; 356/495; 356/504; 356/479; 356/497

(58) Field of Classification Search .................. 356/498, 356/512–514, 489, 495, 504, 479, 497
See application file for complete search history.

(56) References Cited

U.S. PATENT DOCUMENTS

| | | | | |
|---|---|---|---|---|
| H0000637 H  * | 6/1989 | Baciak | ........................... | 356/508 |
| 5,133,601 A  * | 7/1992 | Cohen et al. | ................... | 356/497 |
| 7,057,742 B2 * | 6/2006 | Marron et al. | ................ | 356/512 |
| 7,259,860 B2 * | 8/2007 | Marron et al. | ................ | 356/451 |
| 7,385,709 B2 * | 6/2008 | Plamann et al. | ............... | 356/604 |
| 2002/0018192 A1* | 2/2002 | Nishi | ............................... | 355/53 |

* cited by examiner

*Primary Examiner* — Tarifur Chowdhury
*Assistant Examiner* — Sunghee Y Gray
(74) *Attorney, Agent, or Firm* — Antonio R. Durando

(57) ABSTRACT

The time delay (and therefore the OPD) between object and reference beams in an interferometer is manipulated by changing the spectral properties of the source. The spectral distribution is tuned to produce a modulation peak at a value of OPD equal to the optical distance between the object and reference arms of a Fizeau interferometer, thereby enabling the use of its common-axis configuration to carry out white-light measurements free of coherence noise. Unwanted interferences from other reflections in the optical path are also removed by illuminating the object with appropriate spectral characteristics. OPD scanning is implemented without mechanical means by altering the source spectrum over time so as to shift the peak location by a predetermined scanning step between acquisition frames. Finally, the spectrum is controlled on a pixel-by-pixel basis to create a virtual surface that matches the profile of a particular sample surface.

21 Claims, 7 Drawing Sheets

SPECTRALLY CONTROLLABLE LIGHT SOURCES IN INTERFEROMETRY

RELATED APPLICATIONS

This application is based on and claims the benefit of priority of U.S. Provisional Application No. 61/187,024, filed Jun. 15, 2009, which is hereby incorporated by reference in its entirety.

BACKGROUND OF THE INVENTION

1. Field of the Invention

This invention relates in general to the field of interferometry and, in particular, to a novel interferometric methods and interferometers for simultaneously obtaining the advantages of both white light and high coherence interferometry by modulating the spectral distribution of the light source.

2. Description of the Prior Art

High-accuracy shape measurements are an indispensable part of modern technology. In particular, interferometric methods rely on the interference of two beams of light to produce interference patterns from which measurement information about a test surface can be extracted. One beam, normally referred to as the object beam, is reflected from the test surface and carries information about its topography or other property. The other, reference, beam is a standard against which the object beam is compared and is typically produced by reflecting light from a surface of known geometry, such as a flat or a spherical surface (normally referred to in the art as reference flat and reference or transmission sphere, respectively). The two beams are combined to cause them to interfere and the shape of the test part is recovered by analyzing the interference pattern with methods well known in the art, such as phase-shifting or carrier-fringe algorithms.

All interferometric techniques rely on the properties of the light source, such as its spectral and spatial distribution, to form interference fringes from which surface characteristics of the test object are recovered. There are several types of interferometers, typically categorized by the geometrical arrangement of the object and reference arms and by the type of light source, namely the so-called temporal and spatial coherence of the light. Interferometers that use high temporal coherence sources are normally referred to as laser interferometers, while instruments that use temporally incoherent (or low coherence) sources are referred to as white-light interferometers (WLI). One of the most significant distinctions between these two types of interferometer is the localization of the interference fringes. WLIs produce fringes that are only visible in a limited space around the location where the optical path length difference (OPD) between the object and the reference beams is close to zero; i.e., where the delay between the object and reference beams is very small (localized fringes). In laser interferometry the fringes are formed for much larger OPD values; thus, the fringes are not localized but they are repeated periodically as the OPD varies with a period of one wavelength of the source.

A common implementation of white-light interferometry is the Michelson interferometer, illustrated schematically in FIG. 1. The white light L emitted from a source 10 is split by a beam-splitter 12 into an object beam O and a reference beam R. The object beam is directed toward and reflected back to the beam-splitter by the surface 14 of a test object, while the reference beam is directed toward and reflected back by a reference mirror 16 of known shape. Upon passing through the beam-splitter 12, the two beams are recombined to produce interference fringes that reach maximum intensity when the OPD between the reference and object arms of the interferometer (i.e., the difference in their distance from the beam-splitter) is reduced to zero. A scanning mechanism 18 is used to change the position of the test object (or, alternatively, of the reference mirror) so that the OPD at every measured point (or pixel) on the surface of the object can be reduced to substantially zero during a measurement. The resulting interferogram I is detected by a detector 20 and recorded for analysis by a processor 22. Because white-light interferometers produce fringes only around the zero OPD location, they are suitable for so-called scanning interferometry. This is because all portions of the surface of the sample are measured with a single scan as the respective interference fringes, which only occur within the coherence length of the light, are thereby localized at the detector 20.

The Fizeau interferometer configuration is often used in laser and narrowband interferometry. As illustrated schematically in FIG. 2, a monochromatic or narrowband light beam L' typically produced by a laser source 24 is reflected by a beam-splitter 26 toward a transparent reference flat 28 and an axially aligned object surface 30. Upon reflection of the light L' from each surface, a reference beam R and an object beam O are produced and returned on axis toward the beam-splitter 28. The beams are recombined, thereby producing interference, and are passed back through the beam-splitter to a detector 32 and processor 34 for recordation and analysis. A shifting mechanism 36 is provided to shift the position of the test object (or the reference mirror) so that phase-shifting measurements can be carried out. Because of the multiple fringes produced by laser interferometers, they are best suited for measuring smooth surfaces without discontinuities.

Each type of interferometer has strengths over the other, but also weaknesses that render it unsuitable for particular applications that are best addressed by the other. For example, Fizeau interferometers are particularly valuable for their common-path configuration that greatly reduces measurement errors caused by the interferometer's optical system. However, they are susceptible to coherence noise, such as speckle and diffraction patterns caused by contamination, because high-coherence light has the ability to interfere even when the OPD is quite large. Examples of such noise are typical concentric fringe patterns stemming from diffraction on dust particles that may be present on the active optical surfaces of the interferometer (so-called bulls eyes). As a result, laser interferometers require extremely clean interiors and assembly in clean rooms. Another common problem with laser interferometry is the stability and the coherence length of the laser source. Often, especially for gas lasers with long cavity, the source emits multiple longitudinal modes that limit the total OPD of coherence. Short cavity gas lasers can produce a single longitudinal mode that provides much longer coherence lengths but that can also exhibit power and coherence length fluctuations.

White-light interferometers are generally free from coherence noise and stability. Because they produce only localized fringes, they can be designed to avoid interference from spurious reflections, such as from the intervening surfaces of glass blocks disposed in the optical path. However, WLIs require careful balancing of the OPD in order to produce fringes at the desired location and their scanning mechanism and moving parts require a more complicated mechanical design to ensure a precise scanning motion. These design requirements are significantly less stringent in laser interferometers.

In view of the foregoing, an interferometric method and an interferometer that provide the advantages of both laser and white-light interferometry would be very desirable and would represent a significant advance in the art.

SUMMARY OF THE INVENTION

The present invention provides novel interferometric methods and apparatus wherein the application of Fourier Transforms to interferometry affords a tool for manipulating the spectrum of the light source to achieve numerous useful results heretofore unattainable in the art. In particular, the spectral properties of the light source are manipulated as required to produce localized interference fringes at selected locations. The Fourier Transform relationship between the spectral power distribution of the light source and the time-domain interference modulation produced thereby is advantageously used to determine the spectral power distribution required to produce the desired result. In contrast to the conventional wisdom in white-light interferometry that extraneous modulation peaks are undesirable, the present invention exploits the additional peaks that result from modulating the power spectrum of the source in order to achieve advantages previously unrecognized in the art.

According to one aspect of the invention, the spectral distribution is tuned sinusoidally to produce a modulation peak at a value of OPD equal to the optical path length difference between the object and reference arms of a Fizeau interferometer, thereby making it possible to use the Fizeau configuration to carry out white-light measurements without the coherence noise typical of laser interferometers. The common-axis configuration of the Fizeau interferometer affords all the advantages of white-light interferometry (measurement by scanning through the height of the sample surface; relative immunity from spurious fringes) together with the simpler construction of laser interferometry.

According to another aspect of the invention, unwanted interference from reflections on interfaces in the optical path toward the measured object (such as from the surfaces of a glass plate overlaying the sample surface, for instance) can be removed by illuminating the object with a light source with the appropriate spectral characteristics. Namely, the power spectrum of the light source is tuned to produce a peak with a time delay τ corresponding only to the OPD between the reference arm and the position of the sample surface of interest along the optical path of the object arm. By manipulating the spectral density of the light source, the coherence length of the fringes is also decreased to avoid interference produced by reflections from the other surfaces.

Another application of the invention is the implementation of OPD scanning (such as in conventional WLI scanning) without the use of mechanical means. The effect of OPD scanning is replicated with a spectrally controlled light source by altering the spectrum over time so as to shift the peak location by a predetermined scanning step between data acquisition frames. Such a device affords the same functionality as conventional WLI scanning but does not require any moving parts. Inasmuch as the mechanical movement of parts in conventional interferometry is one of the main sources of errors and of expense in manufacture and maintenance, this feature of the invention provides a significant functional advantage that may also improve the accuracy of measurements.

According to still another aspect of the invention, the spectral properties of the light source are controlled on a pixel-by-pixel basis to create a virtual surface that matches the profile of a particular sample surface. That is, the value of τ across the field of view of the interferometer is altered so as to match the optical path distance of the target object surface from the reference surface at each pixel. This produces a virtual surface shaped by the spectral distribution illuminating each pixel of the object. As a consequence, it is possible to form a virtual three-dimensional surface such that only an object with that particular shape produces simultaneously interference fringes at the detector from its entire surface. Such a set up would represent a great improvement for quality control testing of production parts.

Various other advantages will become clear from the description of the invention in the specification that follows and from the novel features particularly pointed out in the appended claims. Therefore, this invention includes the features hereinafter illustrated in the drawings, fully described in the detailed description of the preferred embodiments and particularly pointed out in the claims, but such drawings and description disclose only some of the various ways in which the invention may be practiced.

DETAILED DESCRIPTION OF THE INVENTION

As used in this disclosure, "white light" is intended to refer to any broadband light of the type used in the art of white-light interferometry, typically having a bandwidth on the order of many nanometers. With reference to light, the terms "frequency" and "wavelength" are used alternatively, as commonly done in the art, because of their well known inverse relationship. "OPD" and "time delay" (τ) are used alternatively because of their space/time relationship in interferometry. Similarly, "sine" and "cosine," as well as related terms, are used alternatively unless specifically indicated otherwise. As used herein, the terms "modulate" and "modulation" in connection with a light source refer in the broadest sense to include any alteration of the frequency distribution, amplitude distribution or phase distribution of energy produced by the light source, and the synthesis of a light signal having a desired frequency, amplitude and phase distribution by any means. When used in connection with interference fringes, the term "modulation" refers to the fringe envelope. In the figures, localized fringes are shown positioned at the surfaces from which they are produced to illustrate how they relate to those surfaces and surface shapes that produce them; however, it is to be understood that physically the localized fringes actually exist in measurement space at the surface of a detector.

Figure 1:
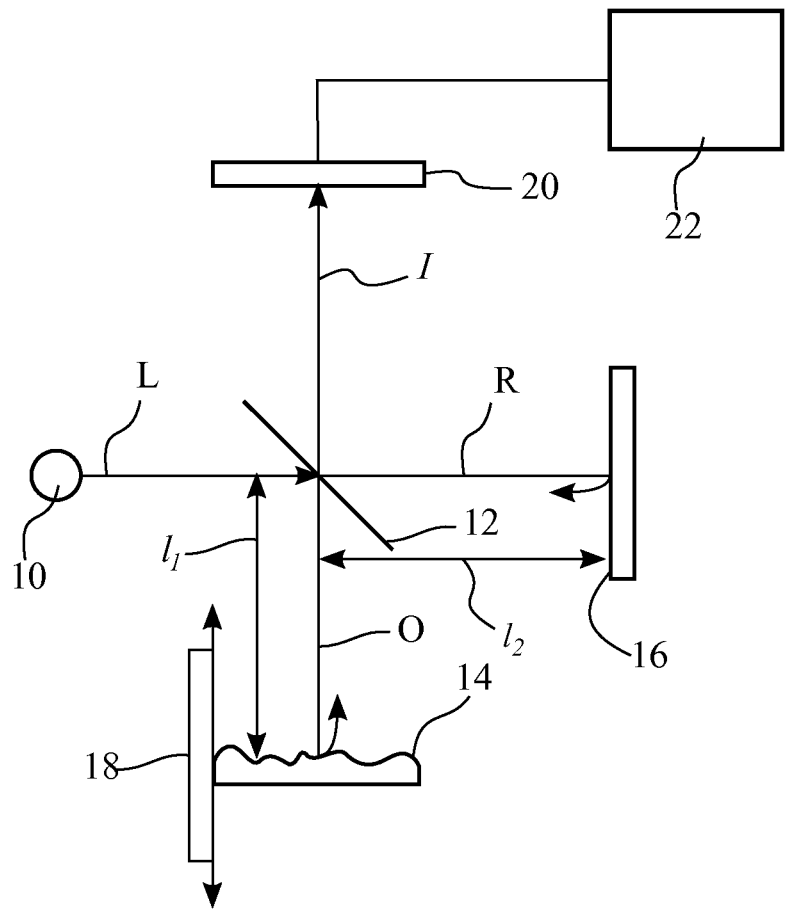
FIG. 1 is a schematic illustration of a conventional Michelson interferometer.
Figure 2:
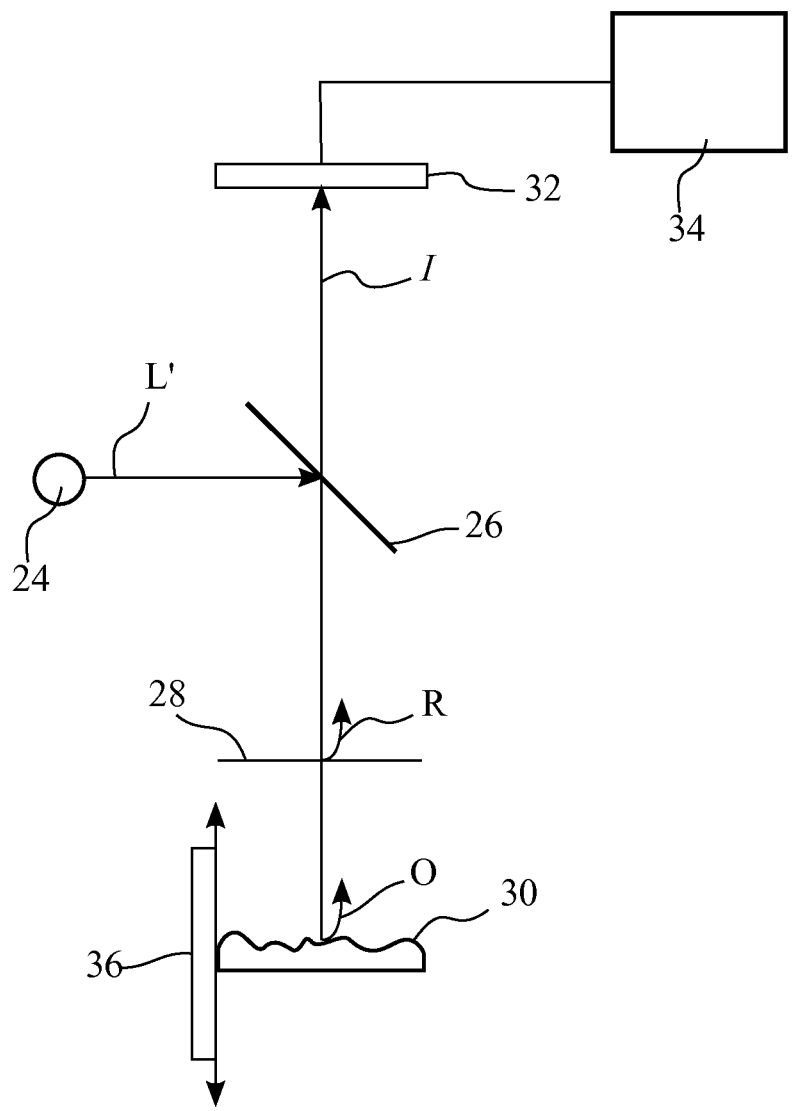
FIG. 2 is a schematic illustration of a conventional Fizeau interferometer.

Polychromatic light sources may be analyzed as the linear superposition of a large number of monochromatic sources. When light enters an interferometer such as the Michelson configuration shown in FIG. 1, the beam L emitted by the source is split into two beams (O and R) that are recombined after reflecting off the object and the reference mirror. The scanning mechanism introduces a time delay τ between the two beams that is equivalent to an OPD of $$2\frac{l_1 - l_2}{c},$$

where $l_1$ and $l_2$ are the lengths of the interferometer's object and reference arms, respectively, and c is the speed of light. When the beams O and R are recombined and interfere, the intensity pattern I can be expressed as $$I(\tau, v) = E(t, v)E^*(t-\tau, v) \tag{1}$$

where E and E* are the complex amplitudes of the object and reference beams, respectively, v is the frequency of the light wave, and t is time. The sum over all optical frequencies (or wavelengths) of the light source L yields $$I(\tau) = \int_0^{+\infty} E(t, v)E^*(t - \tau, v) dv = \int_0^{+\infty} E(v)E^*(v)e^{-2\pi i \tau v} dv. \tag{2}$$

Inasmuch as the integral of Equation 2 has the form of a Fourier Transform, it may be written as $$I(\tau) = FT[P(v)], \tag{3}$$

where FT is the Fourier Transform operator and $P(v) = E(v)E^*(v)$ is the spectral power distribution of the source. Therefore, the spectral power distribution P(v) can be recovered from the intensity pattern I(τ) by applying the inverse Fourier Transform operator, that is $$P(v) = FT^{-1}[I(\tau)]. \tag{4}$$

Thus, the intensity of interference fringes I(τ) and the spectral power distribution P(v) of the source are related to each other by the Fourier Transfer operator FT with the OPD (or more precisely τ) and the optical frequency v acting as the conjugate variables.

Figure 3:
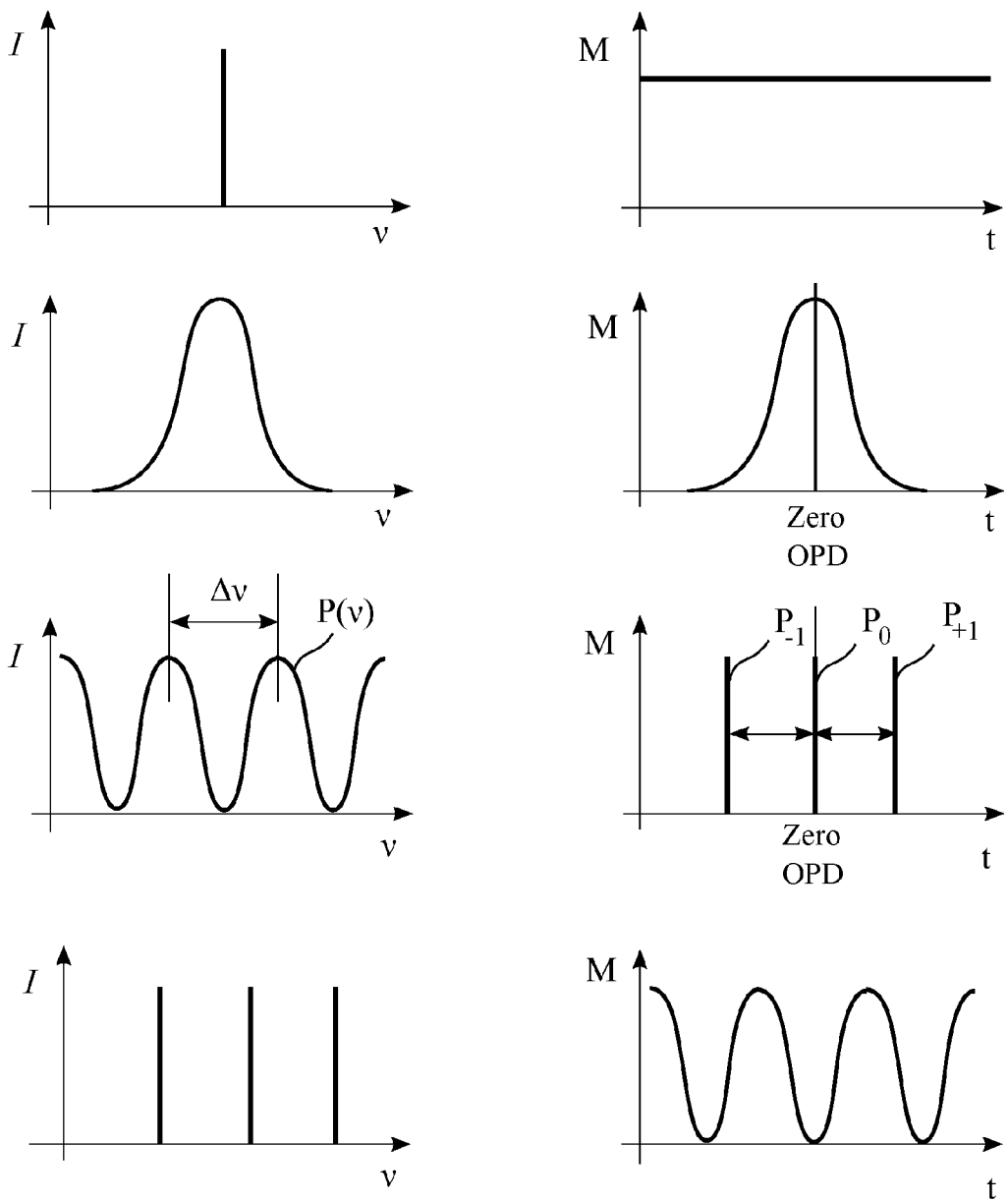
FIG. 3 shows four examples of the relationship between a frequency-domain function and its time-domain Fourier Transform.

This property is widely utilized in Fourier Transform spectrometry where the spectrum of incident light is recovered by capturing and processing interference fringes. For example, as illustrated in FIG. 3, top row, the Fourier Transform of a monochromatic power spectrum is a constant, which corresponds to the constant modulation or contrast produced by such source in the time domain upon interference. The Fourier Transform of a Gaussian source (shown in the second row of the figure), as well as any wide-band source, will produce an interference modulation with a single peak corresponding to zero OPD. The Fourier transform of a perfectly sinusoidal power spectrum, shown in ideal form in the third row of FIG. 3, shows two additional peaks corresponding to interference fringes with maximum modulation not only at zero OPD, but also at two symmetric locations equidistant from zero OPD. The bottom row in the figure shows the conjugate between the forward and inverse Fourier Transforms of a given function.

Figure 4:
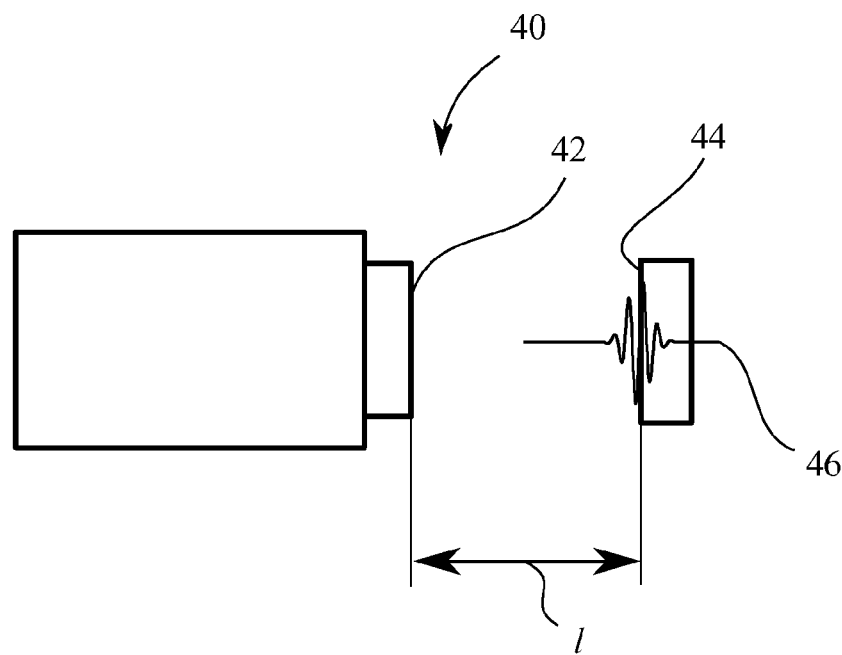
FIG. 4 is a physical representation of a typical Fizeau interferometer illustrating interference fringes produced by a light source modulated according to the invention, positioned for illustrative purposes so that the peak of the fringe envelope is located at the test surface to which the fringes correspond.

FIG. 4 illustrates the relevant components of a Fizeau interferometer 40 for the purpose of enabling the present invention. Assume, for example, that the reference surface 42 and the object surface 44 are separated by an optical path length l and that, according to the invention, it is desired to produce interference fringes 46 with maximum modulation, as shown in FIG. 4 in accordance with convention at the location of the surface 42 that produces the fringes, it being understood that the peak of the fringes is localized at a selected location where they can be detected.

As shown in FIG. 3, third row, two symmetrical fringes may be obtained at non-zero OPD locations by modulating the source's power spectrum in sinusoidal fashion. From the Fourier Transform relationship between the two conjugate functions, the time delay τ (corresponding the distance l between the interference peak $P_0$ at zero OPD and the two peaks, $P_{-1}$ and $P_{+1}$, produced by modulation of the source) can be is expressed as $$\tau = \frac{2}{\Delta v} \tag{5}$$

where 1/Δv is the period of the sinusoidal power spectrum distribution (illustrated by the cosine function P(v) in FIG. 3) modulated in the optical frequency domain according to the invention, as explained below. Converted to time and wavelength domains, Equation 5 becomes $$l = \frac{\lambda^2}{\Delta \lambda} \tag{6}$$

where l is the distance between the reference surface 42 and the object surface 44 (the OPD) of the interferometer and Δλ, is the wavelength difference corresponding to one period in frequency space.

Based on the foregoing, the table below lists some examples of values calculated for different periods of the cosine function P(v) assuming a central wavelength of 500 nm (very common in white-light interferometry).

| Cosine function period | Distance between peaks |
| --- | --- |
| 10 nm | 50 μm |
| 1 nm | 0.5 mm |
| 0.1 nm | 5.0 mm |

Thus, the Fizeau interferometer of FIG. 4 could be operated as a white-light interferometer producing fringes at the sample surface by modulating the power spectrum of the source in sinusoidal fashion. In a configuration where the object surface is 50 microns from the reference surface, for example, the interferometer could be used to carry out white-light interferometry by modulating the power spectrum with a frequency period 10 nanometers.

Figure 5:
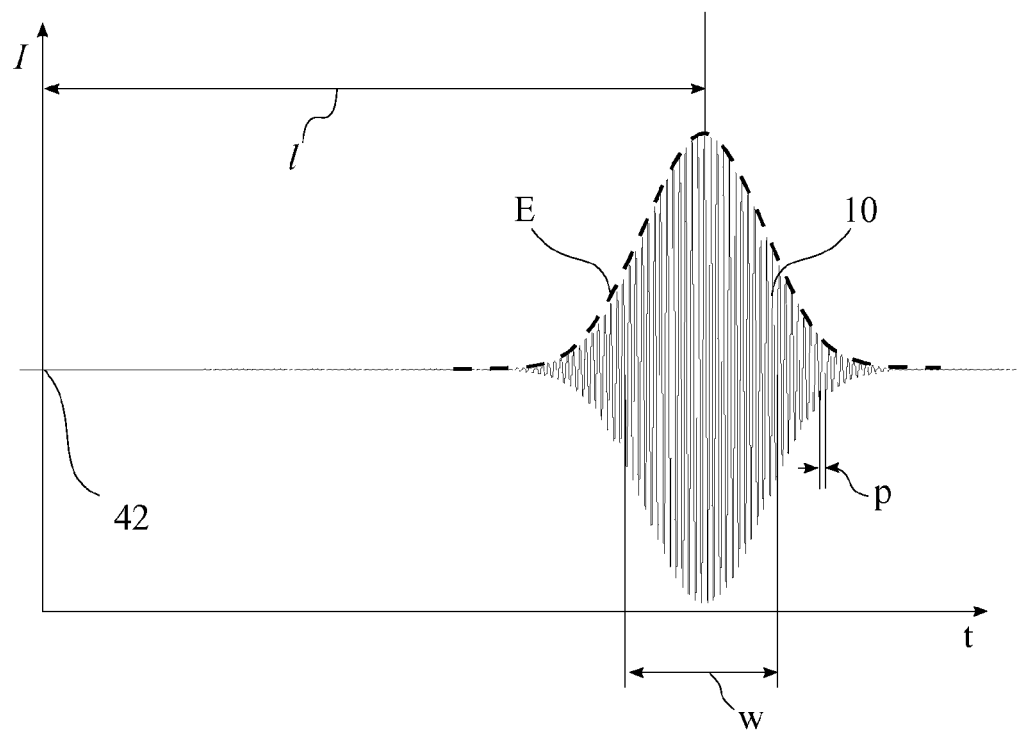
FIG. 5 is an example of modulation fringes desired to be produced at a predetermined location along the optical path of a Fizeau interferometer.

Example. Referring to FIG. 5, assume that it is desired to produce modulation fringes with a peak at a distance l=2 mm from the reference surface 42 of a Fizeau interferometer. It is also desired to produce fringes with a modulation envelope E having full-width half-maximum (FWHM) visibility over a range w=10 μm along the direction of propagation and further with a period p=250 nm between interference fringes. Mathematically, the fringe envelope is described by the equation $$I(\tau) = \delta(\tau - \tau_0) \otimes \exp\left(-\frac{\tau^2}{\tau_w^2}\right), \quad (7)$$

where $\delta$ is the Dirac delta function, and $\otimes$ is the convolution operator. In the time domain, fringes with a peak at a distance l=2 mm from the reference surface will result from an object beam delay of $$\tau = \frac{2l}{c} = 1.33 \cdot 10^{-11}$$

sec with respect to the reference beam. Similarly, the time corresponding to the FWHM visibility range $\tau_w$ and to the fringe period $\tau_p$ will be given by $$\tau_w = \frac{2w}{c} \text{ and } \tau_p = \frac{2p}{c},$$

respectively. Note that the same fringe distribution is produced also for zero and negative values of the time delay $\tau$, which places the fringes, respectively, at the location of the reference surface and in front of it; therefore, they are not visible and do not affect the measurement.

Figure 6:
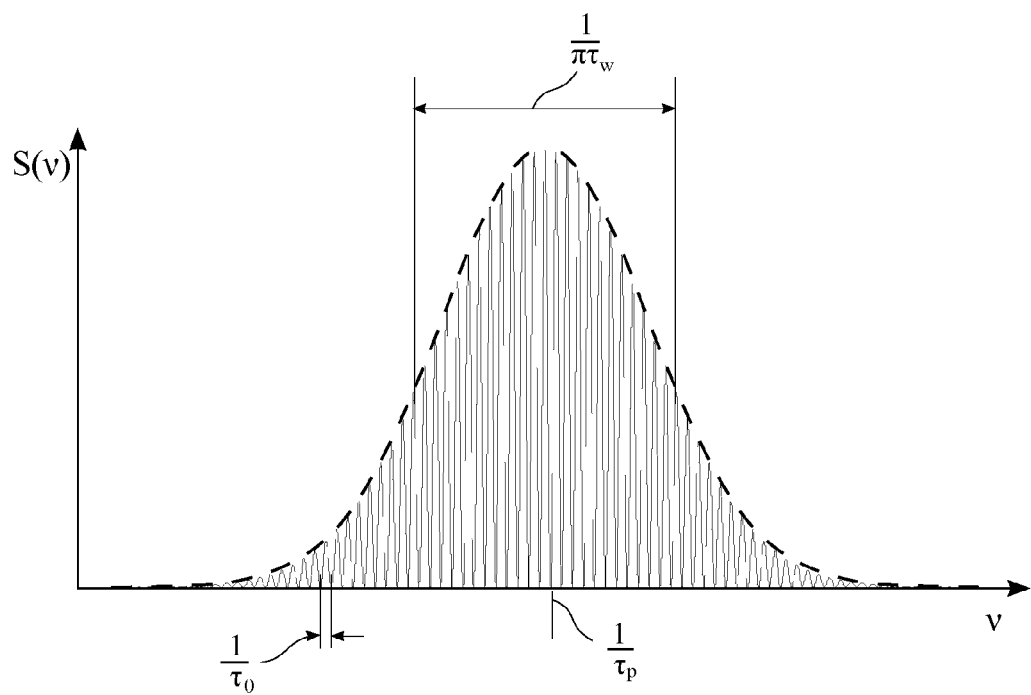
FIG. 6 illustrates the optical power spectrum calculated according to the invention for producing the fringes of FIG. 5.

The spectral power distribution P(v) required to produce the modulation function of Equation 7, $$P(v)=|\exp(-2\pi i\tau_0 v)\exp(-v^2\pi^2\tau_w^2)|=0.5(1+\cos(-2\pi\tau_0 v))\exp(-v^2\pi^2\tau_w^2), \quad (8)$$

illustrated graphically in FIG. 6, is obtained from the inverse Fourier transform of the intensity function. That is, $$P(v)=FT^{-1}[I(\tau)] \quad (9)$$

Equation 8 describes a light source centered around the frequency of $$\frac{1}{\tau_p} = 6 \cdot 10^{14} \text{ Hz},$$

with a Gaussian distribution of FWHM $$\frac{1}{\pi\tau_w} = 0.45 \cdot 10^{13} \text{ Hz},$$

and modulated by cosine fringes with a period of $$\frac{1}{\tau_0} = 0.75 \cdot 10^{11} \text{ Hz}.$$

In terms of wavelength, these values correspond to a source centered around $\lambda_m$=500 nm, with a FWHM bandwidth of 63 nm and a sinusoidal modulation period of 0.06 nm. The sinusoidal modulation is applied in the optical frequency domain v but, in a sufficiently small neighborhood around the mean wavelength $\lambda_m$, the same sinusoidal modulation can be used with a Tayor expansion of the variable $$\frac{1}{\lambda}.$$

Thus, by modulating the power spectrum of the light source so as to produce the spectral distribution of FIG. 6, the conventional Fizeau interferometer of the example will produce fringes with maximum contrast at a distance of 2 mm from its reference surface, as desired. Therefore, the interferometer can be used to perform white-light measurements free of interference from spurious reflections, with coaxial object and reference beams, and with localized fringes suitable for scanning interferometry.

Figure 7:
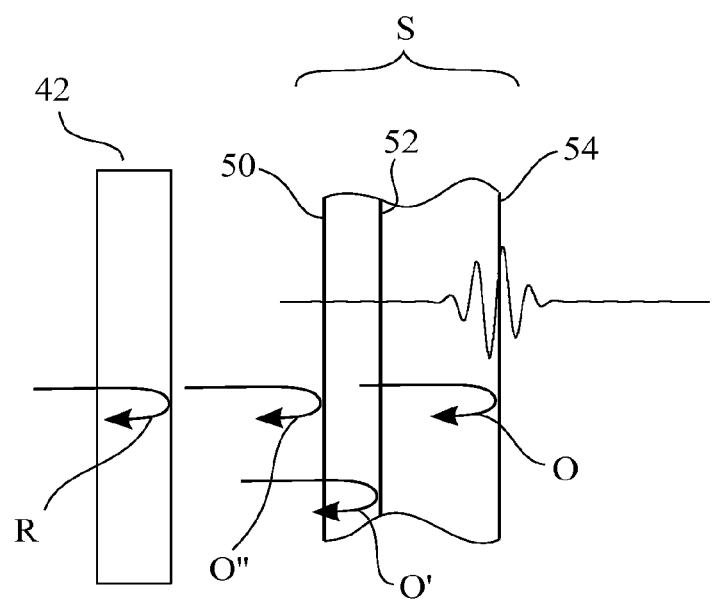
FIG. 7 illustrates the effect of modulating the spectral distribution of the light source according to the invention in order to eliminate spurious fringes when measuring a sample having multiple optical surfaces, wherein the interference fringes produced by a light source modulated according to the invention are positioned for illustrative purposes so that the peak of the fringe envelope is located at the test surface to which the fringes correspond.

Another application of the invention lies in the attenuation of undesirable fringes generated by spurious reflections from optical interfaces in the path to the sample surface. For example, as illustrated in FIG. 7, a sample S may consist of multiple optical surfaces 50, 52 and 54. While profiling surface 54, interference with the reference beam may be produced by reflections not only from the surface 54 but also from the interfaces formed by surfaces 50 and 52. In laser interferometry, all beams (O, O', O") resulting from all these reflections would interfere with each other and the reference beam R causing multiple families of fringe patterns that obscure the measurement. However, by applying the principles of the invention a single set of visible fringes can be produced. This is achieved by modulating the source sinusoidally with a frequency period calculated according to Equation 5 (or equivalently a wavelength period calculated from Equation 6) that would produce a modulation envelope with a peak at the detector corresponding precisely to the location of the object surface of interest (54) and with a coherence length smaller than twice the distance between the object surface 54 and the nearest interface to be obscured (52 in the example). If the surfaces 50 and 52 were also of interest, they could similarly be measured without interference from the other surfaces simply by changing the period of the sinusoidal spectral power distribution as required by the application of Equations 5 and 6 and by ensuring that a suitable coherence length is maintained.

Another application of the invention lies in the ability to perform white-light scanning by modulating the light source spectrum in accordance with the invention instead of using mechanical means to vary the OPD. Such implementation provides the same functionality of conventional mechanical scanning WLIs, but without moving parts and the problems associated with them. It may also provide critical advantages in some setups that would impact positively the accuracy of measurements. Since mechanical movement is one of the main sources of errors in conventional interferometry, a static WLI configuration that does not require physical translation of interferometer's parts represents a significant advance in the art.

Figure 8:
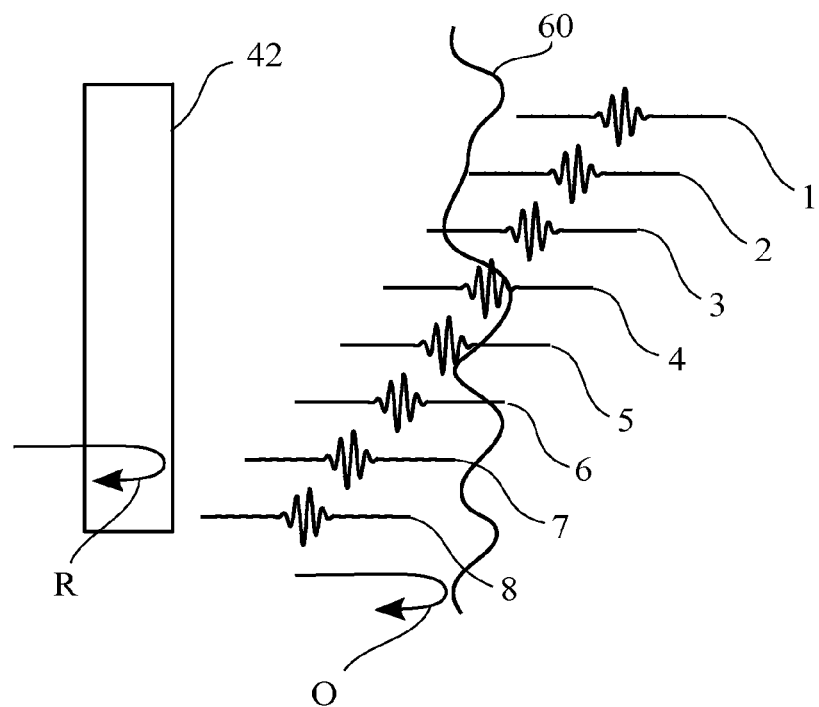
FIG. 8 illustrates an application of the invention wherein the source light is modulated to change the localization of the interference fringes so as to scan though the height of the sample surface, the interference fringes being shown at the sample surface to illustrate the scanning effect.

Referring to FIG. 8 for illustration, assume that a sample surface 60 is located at a predetermined distance from the reference surface 42. The spectral distribution is initially modulated sinusoidally as taught above to produce fringes with peaks corresponding approximately to locations of the object surface, as shown by convention in FIG. 8. By changing the period of the sinusoidal modulation, the value of time delay τ for which the interference pattern is formed is changed, which is equivalent to the OPD change produced by conventional WLI scanning. The interference fringes observed at each step (i.e., after each change of the period of modulation, illustrated as fringe positions 1-8 in the figure) and localized at the detector correspond to the OPD of the light reflected from a particular point on the object and can therefore be used in conventional manner as a means of calculating the height of the object at that point. As illustrated in FIG. 8, consecutive images are acquired by a camera looking at the object while τ is progressively changed so as to obtain a sequence of image frames, each of which has a specific value of OPD. Analysis of such data to reconstruct the object's shape can be done with any standard method used in white-light interferometry.

Such application of the invention to implement white-light interferometry can be used to retrofit any laser or white-light interferometer just by providing spectral source modulation and the means for coordinated frame acquisition. The lack of moving parts also make it possible to employ this kind of device in situations where access is restricted or in hazardous areas, where the use of standard WLIs is currently problematic.

A similar application of the invention lies in the ability to perform phase shifting interferometry (PSI) by altering the light source spectrum instead of relying on mechanical means for translating the reference surface. Referring back to Equation 8, introducing an additional term φ equal to the phase shift of the sinusoidal modulation of the spectrum yields the equation $$S'(\nu)=\exp(-2\pi i(\tau_0-\phi)\nu)\exp(-\nu^2\pi^2\tau_w^2)=0.5(1+\cos(-2\pi(\tau_0-\phi)\nu))\exp(-\nu^2\pi^2\tau_w^2) \quad (10)$$

Following the rules of Fourier Transform, the intensity distribution is derived from the relation $$I'(\tau)=FT(S'(\nu))=\exp(2\pi i\phi)FT(S(\nu))=\exp(2\pi i\phi)I(\tau) \quad (11)$$

which is equivalent to the original interference pattern but shifted in phase by the same angle φ. In other words, the interference fringes' phase can be changed by shifting the phase of the sinusoidal modulation of the spectrum.

Figure 9:
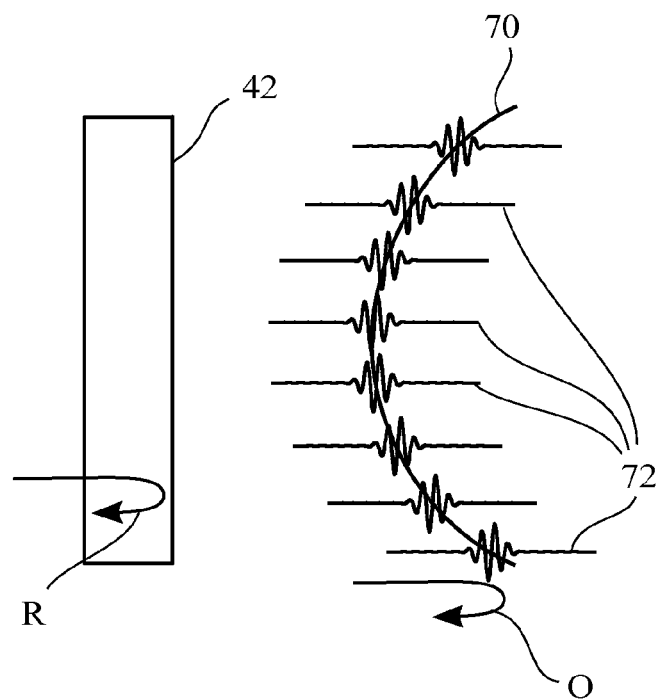
FIG. 9 illustrates an application where the invention is used to form interference fringes defining a predetermined surface profile, wherein the interference fringes produced by a light source modulated according to the invention are positioned for illustrative purposes so that the peak of the fringe envelope is located at the test surface to which the fringes correspond.

Another application of the invention lies in the ability to create virtual surfaces that can be used as references for testing parts of a predetermined profile. To that end, the spectral properties of the light source must be controlled on a pixel-by-pixel basis, so as to produce fringes with maximum visibility at the location corresponding to the height of the part to be tested. Referring to FIG. 9, this can be achieved by modulating the light source, as described, independently for each pixel of the surface 70 in order to vary the value of τ across the field of view of the interferometer and produce simultaneously maximum visibility fringes 72 corresponding to the entire surface of the target object. That is, by modulating the source's spectrum with different values of τ for each object point, a particular three-dimensional surface may be matched. For example, it may be desirable to create a virtual surface such that only an object with a particular shape corresponding to the virtual surface formed by the coherence function would produce interference fringes corresponding to its entire surface.

This is exactly the function of reference surfaces in interferometry. However, the approach of the invention affords the convenience of being able to quickly change the type of surface and even generate patterns that are difficult or impossible to produce otherwise. Conventionally produced, specialized reference objects, such as holographic elements or nulling plates that are inserted in either the object or the reference arm of an interferometer, can be very expensive and provide the proper measurement setup for only one type of object. These disadvantages are overcome by the approach of the invention.

Thus, it has been shown that many useful applications can be implemented based on the idea of modulating the spectral power distribution of the light source of an interferometer. The spectral power distribution of a source that matches the desired distribution of interference fringes can be achieved using the Fourier Transform as a design tool, as illustrated above. The design process starts with the equation for the desired distribution of fringes, such as Equation 7. The Fourier Transform operator is applied, which yields the intensity modulation function of the source's spectrum (Equation 8). If the fringe distribution is symmetric, the result is a real function. For asymmetric fringe envelopes, the result would be a complex function with the imaginary part carrying the information about additional phase modulation of the source required to produce the desired fringe envelope.

Inasmuch as the prerequisite for implementing the invention is the availability of a spectrally controlled light source, it is noteworthy that such devices are currently available in commerce. For example, the Digital Mirror Device (DMD) produced by Texas Instruments is a device widely used in computerized projectors. Another example is the OL 490 Agile Light Source made by Optronic Laboratories, LLC. The spectral resolution of this source (about 10 nm) is too small for most practical interferometric applications, but the existence of such sources demonstrates the feasibility of the invention. In addition, laser-pulse shaping techniques use spatial light modulators, either amplitude or phase based, to alter the spectrum of laser pulses in order to compress their duration. Essentially the same technology can be used in the applications described above for the present invention.

Figure 10:
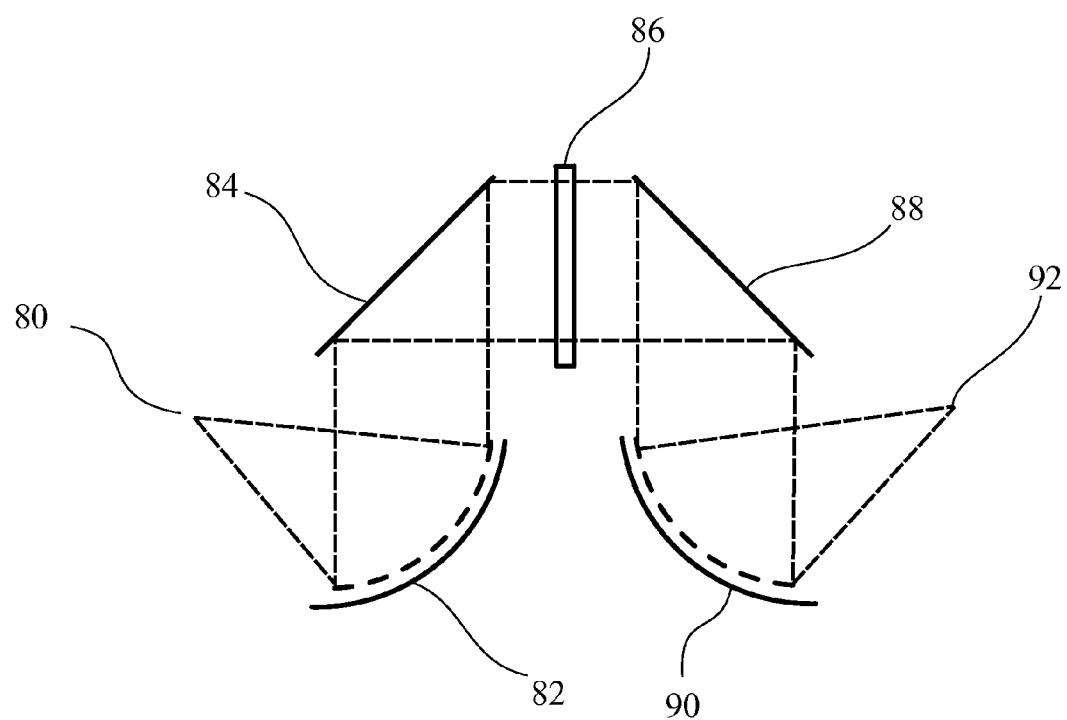
FIG. 10 illustrates schematically an example of a spectrally controllable light source for practicing the invention.

An example of spectrally controllable light source is illustrated FIG. 10, where the light emitted from a point source 80 is reflected from a collimating diffraction grating 82 (e.g., a blazed grating to maximize efficiency) that images the source onto a flat mirror 84. The light is then directed by the mirror to a spatial light modulator 86 that alters the amplitude and phase of the light passing through it. Following the spatial light modulator 86 along the optical axis of the device, a symmetric arrangement with another mirror 88 and grating 90 recombines the light into a single beam available for pickup at a point 92, such as the input of interferometer of the invention.

While the invention has been shown and described herein in what is believed to be the most practical and preferred embodiments, it is recognized that departures can be made therefrom within the scope of the invention. For example, the invention has been illustrated with reference to Fizeau and Michelson interferometers, but the principles of this disclosure are equally applicable to any other type of laser interferometer where white-light scanning could provide advantages. Similarly, it is understood that sinusoidal modulation of the source spectrum is preferred because of its relative simplicity of implementation; however, any modulation as a function of frequency that could be implemented to produce a desired fringe pattern would be acceptable to practice the invention. Therefore, the invention is not to be limited to the disclosed details but is to be accorded the full scope of the claims, including any and all equivalents thereof.

The invention claimed is:

1. An interferometer comprising:
a light source emitting a low-coherence white light;
a reference arm producing a reference beam;
an object arm producing an object beam;
means for combining said reference and object beams to produce a combined interference beam; and
means for modulating said white light in a frequency domain to yield a spectral distribution with simultaneous frequencies adapted to produce fringes with a modulation peak at a non-zero optical path length difference between said reference and object beams along an optical path of said combined interference beam, said non-zero optical path length difference being predetermined by said spectral distribution of the light.

2. The interferometer of claim 1, wherein said spectral distribution is a sinusoidal distribution.

3. The interferometer of claim 1, wherein said modulation peak is localized at a measured object surface when said non-zero optical path length difference is equal to a predetermined optical length.

4. The interferometer of claim 3, wherein said interferometer is a Fizeau interferometer.

5. The interferometer of claim 4, wherein said predetermined optical length is half an optical path length difference between the reference and object arms.

6. The interferometer of claim 1, wherein said fringes with a modulation peak at a non-zero optical path length difference between the reference and object beams are visible over an optical path length smaller than a distance between an object surface being measured by the interferometer and an optical interface positioned along an optical path of said object beam.

7. The interferometer of claim 1, wherein said low-coherence white light is modulated in the frequency domain by sequentially changing a period of modulation over time so as to produce a succession of predetermined spatial patterns of interference fringes between said reference and object beams.

8. The interferometer of claim 1, wherein said low-coherence white light is further modified to sequentially produce changes in a phase of interference fringes produced by said reference and object beams.

9. The interferometer of claim 1, wherein said low-coherence white light is modulated independently for different pixels of an object surface.

10. The interferometer of claim 9, wherein said fringes with a modulation peak at a non-zero optical path length difference between the reference and object beams along the optical path of the combined interference beam include a peak for each of said pixels localized at a measured object surface when an optical path length difference between said reference and object arms is equal to a respective predetermined optical length.

11. An interferometric method comprising the steps of:
providing an interferometer with a source emitting a low-coherence white light, a reference arm producing a reference beam, an object arm producing an object beam, and means for combining said reference and object beams to produce a combined interference beam; and
modulating the low-coherence white light in a frequency domain to yield a spectral distribution with simultaneous frequencies adapted to produce fringes with a modulation peak at a non-zero optical path length difference between the reference beam and the object beam along an optical path of the combined interference beam, wherein said non-zero optical path length difference is predetermined by the modulating step.

12. The interferometric method of claim 11, wherein said spectral distribution is a sinusoidal distribution.

13. The interferometric method of claim 11, wherein said interferometer is a Fizeau interferometer.

14. The interferometric method of claim 13, wherein said non-zero optical path length difference between the reference beam and the object beam along the optical path of the combined interference beam is half an optical path length difference between said reference arm and object arm of the interferometer.

15. The interferometric method of claim 11, wherein said fringes with a modulation peak at a non-zero optical path length difference between the reference and object beams are visible over an optical path length smaller than a distance between an object surface being measured by the interferometer and an optical interface positioned along an optical path of said object beam.

16. The interferometric method of claim 11, wherein said low-coherence white light is modulated in the frequency domain by sequentially changing a period of modulation over time so as to produce a succession of predetermined spatial patterns of interference fringes between said reference and object beams.

17. The interferometric method of claim 11, further including the step of modifying said spectral distribution to sequentially produce changes in a phase of interference fringes produced by said reference and object beams.

18. The interferometric method of claim 11, wherein said low-coherence white light is modulated independently for different pixels of an object surface.

19. The interferometric method of claim 18, wherein said fringes with a modulation peak at a non-zero optical path length difference between the reference and object beams along the optical path of the combined interference beam include a peak for each of said pixels localized at a measured object surface when an optical path length difference between said reference and object beams is equal to a respective predetermined optical length.

20. An interferometric method, comprising:
illuminating an object with a low-coherence light source;
illuminating a reference surface with the light source so as to cause light reflected from the object and from the reference surface to be combined into an interference beam and produce interference fringes along an optical path of the interference beam; and
modulating the low-coherence light source in a frequency domain to yield a spectral distribution with simultaneous frequencies adapted to produce said interference fringes with a modulation peak at a selected location along said optical path of the combined interference beam;
wherein said location corresponds to a non-zero optical path length difference between said light reflected from the object and from the reference surface, said non-zero optical path length difference being predetermined by said modulating step.

21. The method of claim 20, further comprising determining the position of one or more points of the object based on the modulation required to localize interference fringes produced thereby at selected locations.

* * * * *